United States Patent
Ito et al.

(10) Patent No.: US 7,443,050 B2
(45) Date of Patent: Oct. 28, 2008

(54) POWER DEVICE FOR MULTIPLE LIGHT SOURCES WITH SWITCHING AND CHARGE PUMP CIRCUIT

(75) Inventors: Masayasu Ito, Shizuoka (JP); Fuminori Shiotsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 199 days.

(21) Appl. No.: 11/490,560

(22) Filed: Jul. 21, 2006

(65) Prior Publication Data
US 2007/0019443 A1    Jan. 25, 2007

(30) Foreign Application Priority Data
Jul. 22, 2005    (JP)    ............... 2005-212081

(51) Int. Cl.
*B60L 1/14*    (2006.01)
(52) U.S. Cl. ....................... 307/10.8; 315/82
(58) Field of Classification Search ............. 315/76, 315/77, 82, 227 R, 228, 244, 291, 294, 312, 315/313, 362; 307/10.1, 10.8
See application file for complete search history.

(56) References Cited

U.S. PATENT DOCUMENTS 4,388,559 A * 6/1983 Lefavour ..................... 315/78
5,621,623 A * 4/1997 Kuriyama et al. ............. 363/20
5,706,185 A * 1/1998 Toyama et al. .............. 315/127
7,049,762 B2 * 5/2006 Newton ....................... 315/246

FOREIGN PATENT DOCUMENTS

JP    2004-134146    4/2004

OTHER PUBLICATIONS

Patent Abstracts of Japan, Publication No.: 2004-134146, Publication Date: Apr. 30, 2004 2 pages.

* cited by examiner

*Primary Examiner*—Thuy Vinh Tran
(74) *Attorney, Agent, or Firm*—Osha• Liang LLP

(57) ABSTRACT

To control individually a plurality of loads to be turned on by combining a switching regulator with a charge pump circuit using some of the components of the switching regulator. An LED is controlled to be turned on by a switching regulator having an NMOS transistor connected to a transformer and a control circuit for generating an on/off signal. An LED is controlled to be turned on by a charge pump circuit that shares the NMOS transistor and the control circuit with the switching regulator to charge a condenser with an electric charge during an operation for turning on the NMOS transistor and discharge the electric charge accumulated in the condenser during an operation for turning off the NMOS transistor. Thus, circuit structure is simplified.

10 Claims, 5 Drawing Sheets

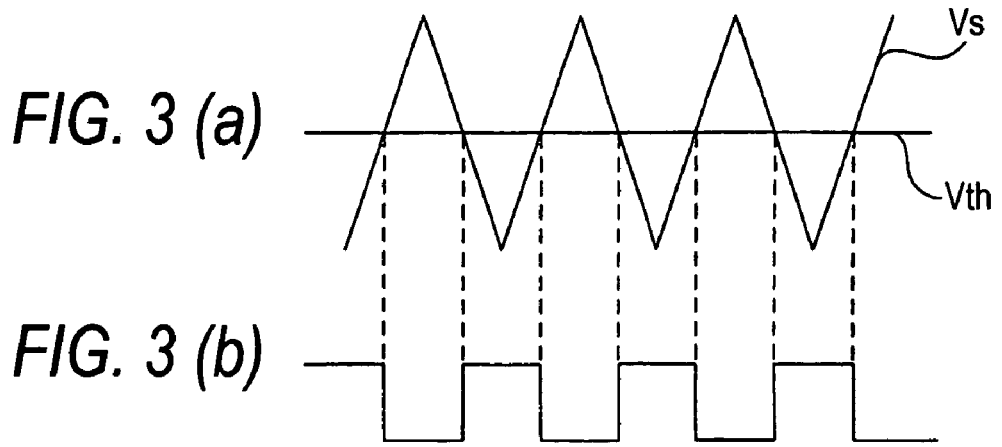
FIG. 3 (a)
FIG. 3 (b)
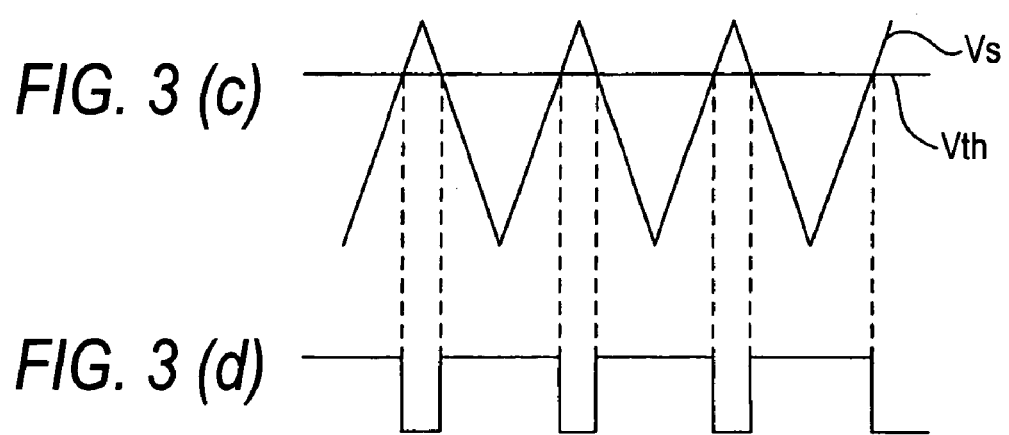
FIG. 3 (c)
FIG. 3 (d)
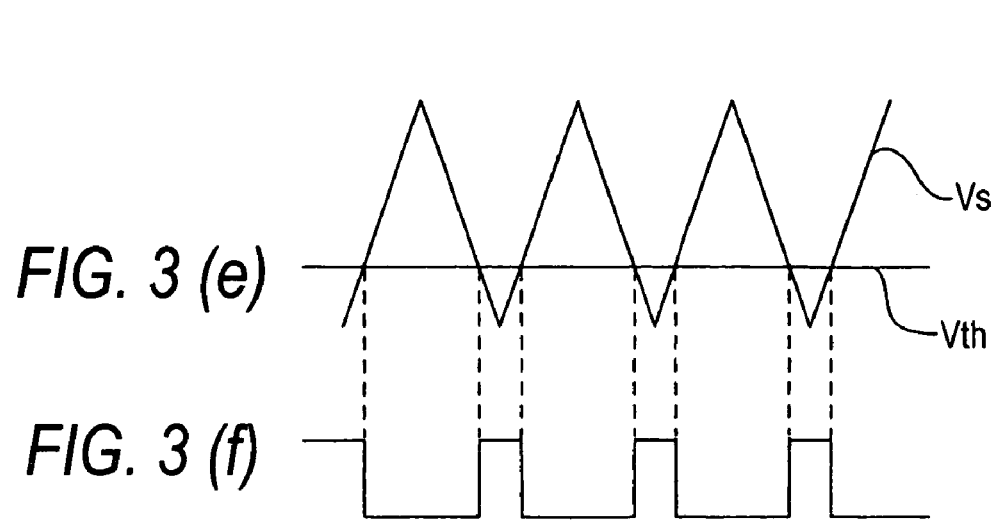
FIG. 3 (e)
FIG. 3 (f)

FIG. 4 (a)
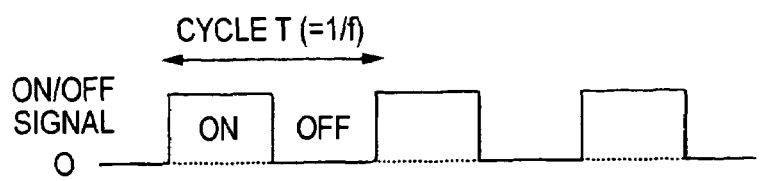
FIG. 4 (b)
FIG. 4 (c)
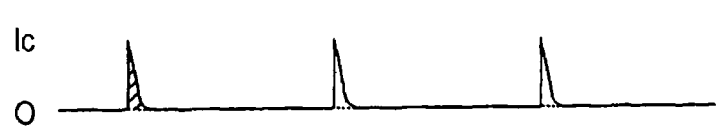
FIG. 4 (d)
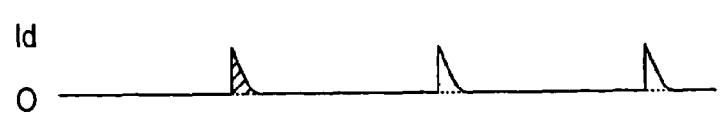
FIG. 5 (a)
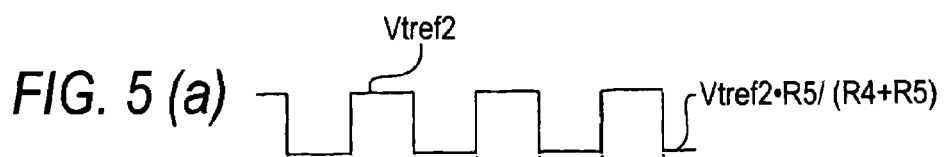
FIG. 5 (b)
FIG. 5 (c)
FIG. 5 (d)
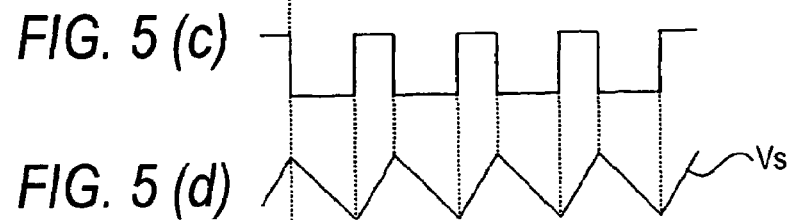
FIG. 5 (e)
FIG. 5 (f)
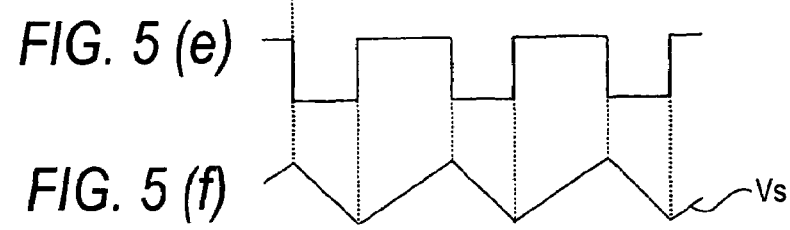

POWER DEVICE FOR MULTIPLE LIGHT SOURCES WITH SWITCHING AND CHARGE PUMP CIRCUIT

BACKGROUND OF INVENTION

1. Field of the Invention

The present invention relates to a power device and more particularly to a power device that has a plurality of light sources as loads and controls the light sources to be respectively turned on.

2. Background Art

As a power device or a lighting controller constructed so as to control the light source of a lighting device for a vehicle to be turned on, a device has been known that uses a switching regulator capable of controlling an output voltage to a light source in accordance with the current of the light source. In the switching regulator, even when a plurality of light sources are connected in series or in parallel with each other, the switching regulator can control a specified current to be supplied respectively to the light sources. Thus, an electric efficiency can be enhanced, a heat generation can be prevented and the light source can be serviceably miniaturized and thinned. However, the number of parts in the switching regulator is large. Further, when a plurality of light sources having different electric power from one another or different kinds of light sources are turned on, if one switching regulator is used for one light source, a circuit scale is enlarged and cost is increased.

Thus, a lighting controller using a time sharing system has been proposed that can supply an electric power to a plurality of different light sources by one switching regulator (see Patent Document 1). In this lighting controller, the plurality of light sources are sequentially selected at respectively designated timing, the output voltage of the switching regulator is applied to the selected light source and the output voltage of the switching regulator is controlled in accordance with electric current supplied to the selected light source.

[Patent Document 1] JP-A-2004-134146 (from page 3 to page 6, FIG. 1).

SUMMARY OF INVENTION

In the above-described related art, because the system involves electric power sequentially supplied to the plurality of light sources from one switching regulator, light source selecting parts for selecting the light sources need to be respectively provided correspondingly to the light sources.

One or more embodiments of the present invention combine a switching regulator with a charge pump circuit using a part of the components of the switching regulator and supply an electric power respectively to loads from the charge pump circuit.

In accordance with one or more embodiments, a power device comprises: a switching regulator having a switching element connected to a transformer or a coil and a control circuit for generating an on/off signal to control the switching element and supplying an input voltage from a power source to a first load by the on/off operation of the switching element in accordance with the on/off signal; and a charge pump circuit for accumulating an electric charge in accordance with the input voltage from the power source during an operation for turning on the switching element and discharging the accumulated electric charge to a second load during an operation for turning off the switching element.

When an electric power is supplied to a plurality of loads, the first load is connected to the switching regulator, the second load is connected to the charge pump circuit, the switching element is turned on and off in accordance with the on/off signal generated by the control circuit of the switching regulator to supply the input voltage from the power source to the first load, the electric charge is accumulated in the charge pump circuit in accordance with the input voltage from the power source during the turning-on operation of the switching element and the accumulated electric charge is discharged to the second load from the charge pump circuit during the turning-off operation of the switching element, the electric power can be supplied to the first load from the switching regulator and the electric power can be supplied to the second load from the charge pump circuit using a part of the components of the switching regulator. Thus, circuit structure can be simplified and cost can be serviceably reduced.

In accordance with one or more embodiments, the control circuit controls an on-duty of the on/off signal to the switching element in accordance with the voltage supplied to the first load and controls the frequency of the on/off signal to the switching element in accordance with the electric charge discharged to the second load in the power device.

Because the on-duty of the on/off signal to the switching element is controlled in accordance with the voltage supplied to the first load and the frequency of the on/off signal to the switching element is controlled in accordance with the electric charge discharged to the second load, even when the switching element and the control circuit are shared by the switching regulator and the charge pump circuit, the electric power can be supplied respectively to the loads depending on the states of the first and the second loads.

In accordance with one or more embodiments, the charge pump circuit has the switch for specifying an operation and a non-operation of the charge pump circuit and the switch is inserted between the power source and the switching element in the power device.

The switch inserted between the power source and the switching element is opened and closed so that the operation and the non-operation of the charge pump circuit can be specified.

In accordance with one or more embodiments, the charge pump circuit includes a diode and a condenser connected to each other in series, one end of the diode is connected to the power source, one end of the condenser is connected to the switching element and voltage is supplied to the second load from a connecting part of the diode and the condenser in the power device.

Because, during an operation for turning on the switching element, the input voltage from the power source is accumulated in the condenser through the diode, the electric charge accumulated in the condenser can be assuredly discharged, during an operation for turning off the switching element, to the second load from the connecting part of the diode and the condenser without circulating the electric charge to the power source.

In accordance with one or more embodiments, a lighting device for a vehicle comprises: the power device as described above and the first load and the second load. The first load and the second load are light emitting sources of vehicles having different electric powers from each other or light emitting sources of different kinds of vehicles.

The first load and the second load may be composed of the light emitting sources having the different electric powers (consumed electric power) from each other, for instance, a lower beam lamp or a bending lamp. Further, the first load and the second load may be composed of the different kinds of light emitting sources, for instance, a semiconductor light source such as an LED (Light Emitting Diode) or a discharge light.

As apparent from the above description, according to the power device of one or more embodiments, circuit structure can be simplified and cost can be serviceably lowered.

Further, in one or more embodiments, even when the switching element and the control circuit are shared by the switching regulator and the charge pump circuit, the electric power can be supplied respectively to the loads depending on the states of the first load and the second load.

Further, in one or more embodiments, the switch inserted between the power source and the switching element is opened and closed so that the operation or the non-operation of the charge pump circuit can be specified.

Further, in one or more embodiments, the electric charge accumulated in the condenser can be assuredly discharged to the second load from the connecting part of the diode and the condenser without circulating the electric charge to the power source.

Further, in one or more embodiments, the first load and the second load may be formed with a lower beam lamp or a bending lamp as the light emitting sources having different electric powers (consumed electric power) from each other. Further, the first load and the second load may be composed of, as the different kinds of light emitting sources, a semiconductor light source such as an LED or a discharge light.

Other aspects and advantages of the invention will be apparent from the following description and the appended claims.

BRIEF DESCRIPTION OF DRAWINGS

FIG. 3, including FIGS. 3a-f, is a wave form diagram for explaining a method for controlling an on-duty of an on/off signal.

FIG. 4, including FIGS. 4a-d, is a wave form diagram for explaining an operation of a charge pump circuit.

FIG. 5, including FIGS. 5a-f, is a wave form diagram for explaining a method for controlling the frequency of the on/off signal.

DETAILED DESCRIPTION

Figure 1:
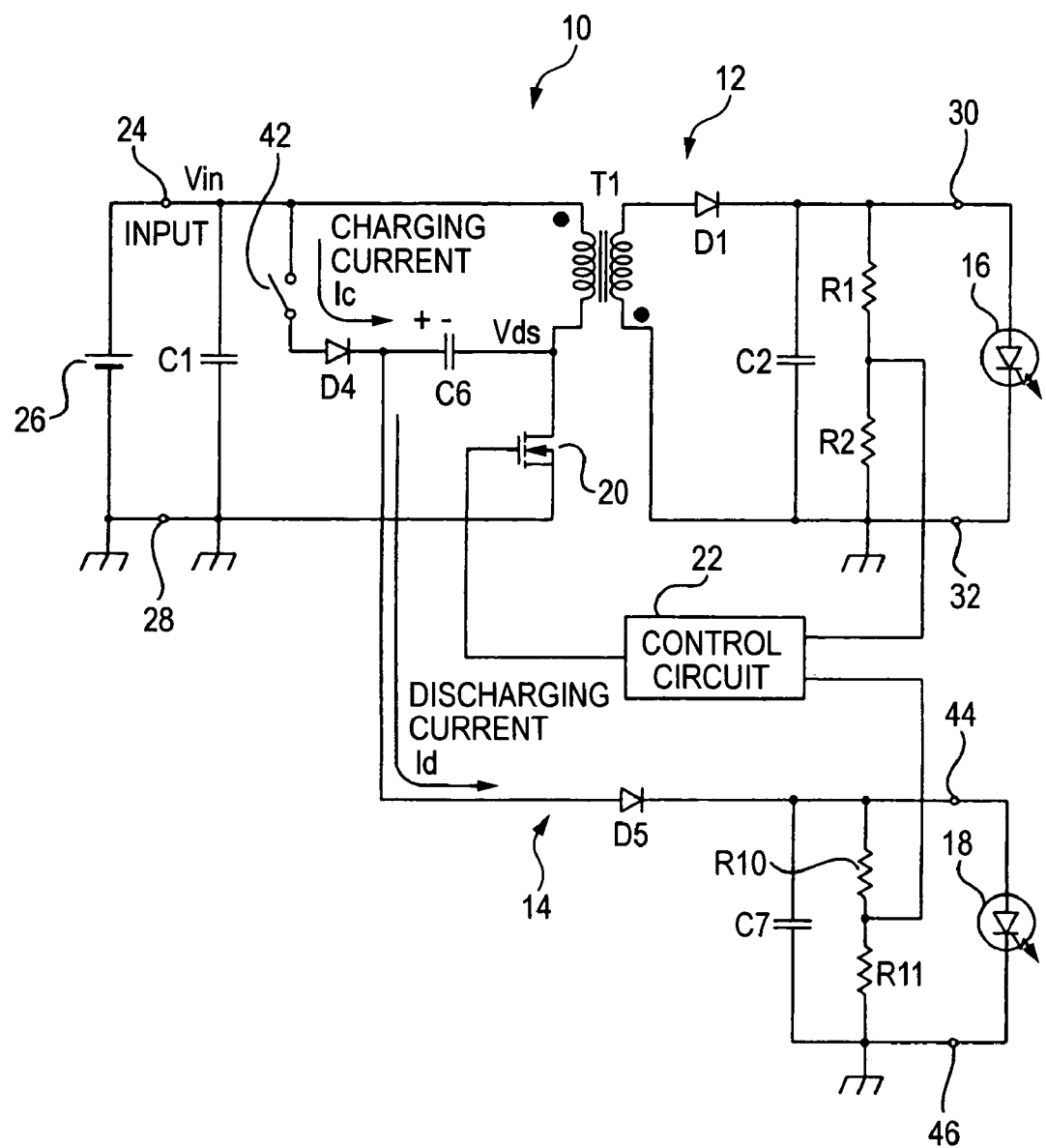
FIG. 1 is a circuit block diagram of a power device showing an embodiment of the present invention.
Figure 2:
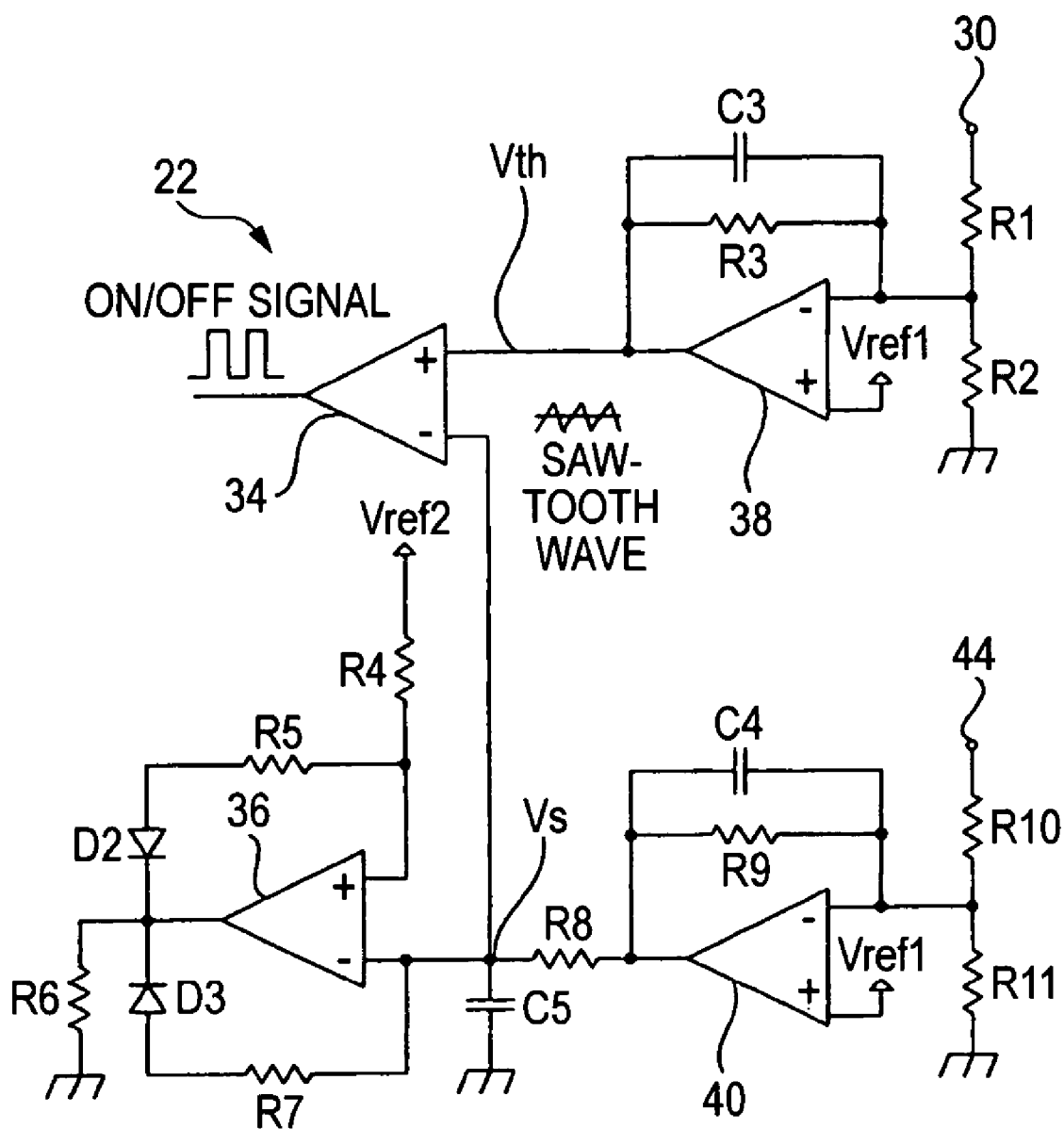
FIG. 2 is a circuit block diagram of a control circuit shown in FIG. 1.
Figure 6:
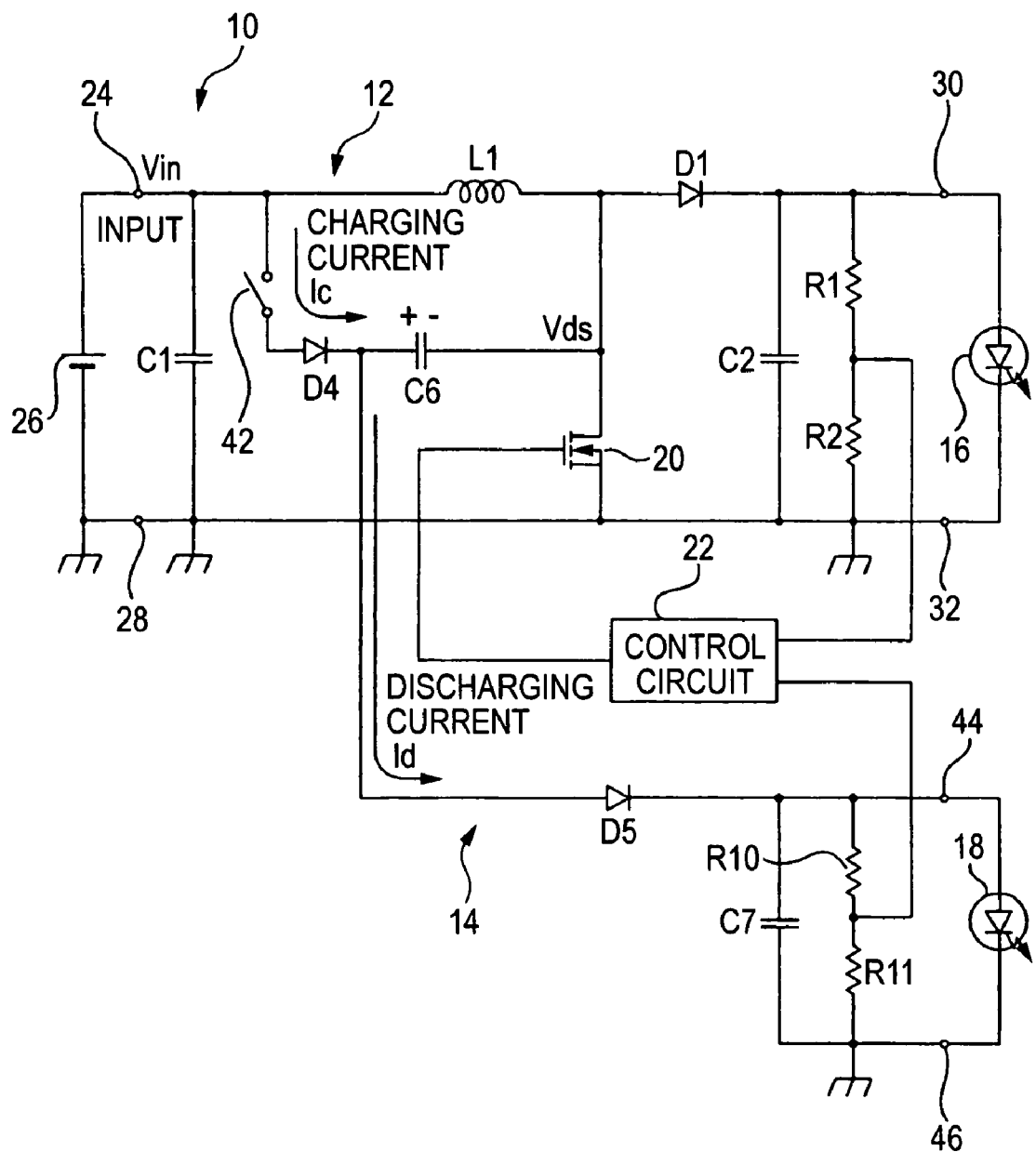
FIG. 6 is a circuit block diagram of a power device showing an embodiment of the present invention.

Now, embodiments of the present invention will be described below. FIG. 1 is a circuit diagram of a power device showing an embodiment of the present invention. FIG. 2 is a circuit diagram of a control circuit shown in FIG. 1. FIG. 3 is a wave form diagram for explaining a method for controlling an on-duty of an on/off signal. FIG. 4 is a wave form diagram for explaining an operation of a charge pump circuit. FIG. 5 is a wave form diagram for explaining a method for controlling the frequency of the on/off signal. FIG. 6 is a circuit diagram of a power device showing an embodiment of the present invention.

In the drawings, as shown in FIG. 1, a power device 10 includes a switching regulator 12 and a charge pump circuit 14 as one elements of, for instance, a lighting device (a light emitting device) for a vehicle. To the switching regulator 12, an LED 16 as a light source (a light emitting source) formed with a semiconductor light emitting element is connected as a first load. An LED 18 is connected to the charge pump circuit 14 as a second load.

As the LEDs 16 and 18, a plurality of LEDs connected in series to each other or a plurality of LEDs connected in parallel with each other may be used. Further, the LEDs 16 and 18 may be formed as light sources of various kinds of lighting devices for vehicles such as a head lamp, a stop and tail lamp, a fog lamp, a turn signal lamp, or the like. Further, when the LEDs 16 and 18 are used as light emitting sources having different electric powers (consumed electric power) from each other, the LED 16 may be used as a lower beam lamp and the LED 18 may be used as a bending lamp. Further, when the LEDs 16 and 18 are used as different kinds of light emitting sources, an inverter such as a full-bridge may be inserted between output terminals 30, 32 and the light emitting source or between output terminals 44, 46 and the light emitting source and a discharge light may be used in place of the LED 16 or the LED 18.

The switching regulator 12 includes, as a switching regulator of a fly back system, a transformer T1, a condenser C1, an NMOS transistor 20, a control circuit 22, a diode D1, a condenser C2 and resistances R1 and R2. To a primary side of the transformed T1, the condenser C1 is connected in parallel and the NMOS transistor 20 is connected in series. One end side of the condenser C1 is connected to a positive terminal of a battery 26 mounted on a vehicle through a power supply input terminal 24. The other end side of the condenser C1 is connected to a negative terminal of the battery 26 mounted on a vehicle through a power supply input terminal 28 and grounded. The NMOS transistor 20 has a drain connected to the primary side of the transformed T1, a source grounded and a gate connected to the control circuit 22. To a secondary side of the transformer T1, the condenser C2 is connected in parallel through the diode D1 and a node of the diode D1 and the condenser C2 is connected to an anode side of the LED 16 through the output terminal 30. One end side of the secondary side of the transformer T1 is connected to the output terminal 32 together with one end side of the condenser C2 and grounded. To the output terminal 30 and the output terminal 32, the serially connected resistances R1 and R2 are connected.

The resistances R1 and R2 divide the output voltage of the switching regulator 12 and feed back the voltage obtained by dividing the output voltage to the control circuit 22. The control circuit 22 generates an on/off signal on the basis of the fed back voltage and outputs the generated on/off signal to the NMOS transistor 20. The NMOS transistor 20 is formed as a switching element that responds to the on/off signal (a switching signal) outputted from the control circuit 22 to carry out an on/off operation. When the NMOS transistor 20 is turned on, input voltage from the battery (a dc power source) 26 mounted on a vehicle is accumulated in the transformer T1 as electromagnetic energy. When the NMOS transistor 20 is turned off, the electromagnetic energy accumulated in the transformer T1 is discharged to the LED 16 from the secondary side of the transformer T1 through the diode D1. In this case, the switching regulator 12 compares the voltage obtained by dividing the voltage by the resistances R1 and R2 with a prescribed voltage to control output voltage in accordance with the compared result.

Specifically, as shown in FIG. 2, the control circuit 22 includes comparators 34 and 36, error amplifiers 38 and 40, condensers C3, C4 and C5, resistances R3, R4, R5, R6, R7, R8 and R9 and diodes D2 and D3. An output side of the comparator 34 is connected to the gate of the NMOS transistor 20. A preamplifier may be provided between the output of the comparator 34 and the gate of the NMOS transistor 20.

The error amplifier 38 inputs a voltage corresponding to a difference between the voltage obtained by dividing the output voltage of the switching regulator 12 by the resistances R1 and R2 and a reference voltage Vref1 to a positive input terminal of the comparator 34 as a threshold value Vth. To a negative input terminal of the comparator 34, a saw-tooth wave (a saw-tooth wave signal) Vs is inputted from a negative input terminal of the comparator 36. The comparator 34 compares the threshold value Vth as the output of the error amplifier 38 with the saw tooth wave Vs to generate an on/off signal corresponding to the compared result and output the generated on/off signal to the gate of the NMOS transistor 20.

For instance, as shown in FIGS. 3(a) and 3(b), when the level of the threshold value Vth is located at a substantially intermediate part of the level of the saw-tooth wave, the on/off signal having an on-duty of about 50% is outputted. On the other hand, as the output voltage of the switching regulator 12 is lowered, when a voltage applied to the negative input terminal of the error amplifier 38 is lowered so that the threshold value Vth by the output of the error amplifier 38 becomes high, as shown in FIGS. 3(c) and 3(d), an on/off signal having a high on-duty is outputted from the comparator 34. In this case, the control circuit 22 controls the output voltage of the switching regulator 12 to be raised.

On the contrary, as the output voltage of the switching regulator 12 is raised, when a voltage applied to the negative input terminal of the error amplifier 38 is raised so that the threshold value Vth by the output of the error amplifier 38 becomes low, as shown in FIGS. 3(e) and 3(f), an on/off signal having a low on-duty is outputted to the NMOS transistor 20 from the comparator 34. In this case, the control circuit 22 controls the output voltage of the switching regulator 12 to be lowered.

That is, the control circuit 22 monitors the output voltage of the switching regulator 12 to control the duty of the on/off signal in accordance with the output voltage of the switching regulator 12 so that the control circuit controls the output voltage of the switching regulator 12 to a prescribed voltage.

On the other hand, as shown in FIGS. 1 and 2, the charge pump circuit 14 shares a part of the NMOS transistor 20 and the control circuit 22 with the switching regulator 12 and includes a switch 42, diodes D4 and D5, condensers C6 and C7 and resistances R10 and R11 as well as these elements.

The switch 42 is formed as a switch for specifying an operation and a non-operation of the charge pump circuit 14. One end side of the switch 42 is connected to the power supply input terminal 24. The other end side is connected to one end side of the condenser C6 through the diode D4. The switch 42 is provided in the input side of the charge pump circuit 14, so that when the switch 42 is turned off, the condenser C7 is not charged with a voltage, and when the LED 18 is turned on, the damage of the LED 18 due to an over-current can be prevented. As the switch 42, a semiconductor switch such as an FET or a transistor can be employed. The other end side of the condenser C6 is connected to a node of the primary side of the transformer T1 and the drain of the NMOS transistor 20. A node (a connecting part) of the diode D4 and the condenser C6 is connected to the output terminal 44 through the diode D5. The output terminal 44 is connected to an anode side of the LED 18. A cathode side of the LED 18 is connected to the output terminal 46 and grounded. To both the ends of the output terminals 44 and 46, the resistance R10 and the resistance R11 are connected in series. The resistances R10 and R11 divide the output voltage of the charge pump circuit 14 and feed back a voltage obtained by dividing the output voltage to the control circuit 22.

Under a condition that the switch 42 is turned on while the charge pump circuit 14 shares the NMOS transistor 20 and the control circuit 22 with the switching regulator 12, when the NMOS transistor 20 is turned on, the charge pump circuit 14 accumulates an electric charge in the condenser C6 through the diode D4 in accordance with input voltage applied to the power supply input terminal 24. The charge pump circuit 14 discharges, during an operation for turning off the NMOS transistor 20, the electric charge accumulated in the condenser C6 to the LED 18 through the diode D5 from the node (the connecting part) of the diode D4 and the condenser C6. In this case, since the electric charge accumulated in the condenser C6 is prevented from being circulated to a power source by the diode D4, the electric charge is assuredly discharged to the LED 18.

That is, as shown in FIGS. 4(a) and 4(b), when the NMOS transistor 20 is turned on, the drain voltage of the NMOS transistor 20 is lowered so that a charging current IC (see FIG. 1) is supplied to the NMOS transistor 20 through the switch 42, the diode D4 and the condenser C6 from the power supply input terminal 24. Thus, as shown in FIG. 4(c), the electric charge is accumulated in the condenser C6 by the charging current Ic. After that, when the NMOS transistor 20 is turned off, the drain voltage of the NMOS transistor 20 is raised so that a discharging current Id (see FIG. 1) is supplied to the condenser C7 or the LED 18 through the diode D5 from the condenser C6. As shown in FIG. 4(d), the discharging current Id has the same amount of electric charge as that of the charging current Ic. Every time the NMOS transistor 20 is turned off, the discharging current is smoothed by the condenser C7, and accordingly, the same amount of electric charge is supplied to the LED 18. In this case, since the output of the charge pump circuit 14 corresponds to an integrated value of the discharging current Id, when the frequency of the on/off signal becomes high, the number of discharges is increased and the output of the charge pump circuit 14 is also increased.

Specifically, when the frequency of the on/off signal to the NMOS transistor 20 is controlled, as shown in FIG. 2, the output voltage of the charge pump circuit 14 is divided by the resistance R10 and the resistance R11. A voltage corresponding to the difference between the voltage obtained by dividing the output voltage and a reference voltage V ref1 is outputted from the error amplifier 40. The voltage is applied to the condenser C5 through the resistance R8 and the saw-tooth wave Vs corresponding to an amount of electric charge due to charging and discharging operations is generated at both ends of the condenser C5.

The electric charge accumulated in the condenser C5 is discharged through the resistance R7 when the output of the comparator 36 is located at a low level. On the other hand, when the output of the comparator 36 is located at a high level, as shown in FIGS. 5(a) and 5(b), a reference voltage V ref2 is applied to a positive input terminal of the comparator 36, the voltage of the negative input terminal of the comparator 36 rises by considering the V ref2 to be a target voltage and the output of the error amplifier 40 is applied to the condenser C5 through the resistance R8 to charge the condenser C5 with the electric charge. As the condenser C5 is charged with the electric charge, the voltage of the negative input terminal of the comparator 36 rises. When the voltage of the negative input terminal of the comparator 36 reaches the target voltage, the output of the comparator 36 is inverted to the low level from the high level. Thus, the voltage of the positive input terminal of the comparator 36 becomes V ref2*R5/(R4+R5)

and the electric charge of the condenser C5 is discharged through the resistance R7 by considering the above-described voltage to be a target voltage. Such operations are repeated so that the saw-tooth wave Vs is generated from the negative input terminal of the comparator 36. Then, the saw-tooth wave Vs is compared with the threshold value Vth in the comparator 34. Then, the on/off signal corresponding to the compared result of the saw-tooth wave Vs with the threshold value Vth is outputted from the comparator 34.

When the output voltage of the charge pump circuit 14 is lowered so that a voltage applied to the negative input terminal of the error amplifier 40 is lowered, the output voltage of the error amplifier 40 becomes high to shorten a charging time of the condenser C5. Accordingly, as shown in FIGS. 5(c) and 5(d), the frequency of the saw-tooth wave Vs is increased. As a result, the frequency of the on/off signal is also increased. As the number of times of charging and discharging operations in the condenser C6 is increased, the output voltage of the charge pump circuit 14 is raised.

Conversely, when the output voltage of the charge pump circuit 14 is raised so that a voltage applied to the negative input terminal of the error amplifier 40 rises, the output of the error amplifier 40 becomes low to lengthen a charging time of the condenser C5. Accordingly, as shown in FIGS. 5(e) and 5(f), the frequency of the saw-tooth wave Vs is decreased. As a result, the frequency of the on/off signal is also decreased. As the number of times of charging and discharging operations in the condenser C6 is decreased, the output voltage of the charge pump circuit 14 is lowered. Such control operations are repeated so that the output voltage of the charge pump circuit 14 can be controlled to a designated voltage.

According to this embodiment, since the switching regulator 12 of a fly back system is used to control the LED 16 to be turned on and the charge pump circuit 14 is used to control the LED 18 to be turned on, and the NMOS transistor 20 and the control circuit 22 are shared by the switching regulator 12 and the charge pump circuit 14, the LEDs 16 and 18 can be individually controlled to be turned on. Further, the circuit structure can be simplified and a cost can be serviceably reduced.

Now, a second embodiment of the present invention will be described below by referring to FIG. 6. In this embodiment, a coil L1 is used in place of the transformer T1 shown in FIG. 1 to form a booster type switching regulator 12. Other structures are the same as those of a device in FIG. 1. One end side of the coil L1 is connected to a power supply input terminal 24 and a switch 42. The other end side is connected to a drain of an NMOS transistor 20 and an anode side of a diode D1.

According to the second embodiment, since the booster type switching regulator 12 is used to control an LED 16 to be turned on and a charge pump circuit 14 is used to control an LED 18 to be turned on, and the NMOS transistor 20 and a control circuit 22 are shared the switching regulator 12 and the charge pump circuit 14, the LEDs 16 and 18 can be individually controlled to be turned on. Further, a circuit structure can be simplified and a cost can be serviceably reduced.

In each of the embodiments, the power device is used for the lighting device for a vehicle, however, the present invention may be applied to other devices than the lighting device for a vehicle.

In the above-described embodiments, though the example is mentioned in which the output voltage is fed back, a shunt resistance may be connected in series to a light source and the fall of the voltage thereof may be inputted to negative input terminals of error amplifiers 38 and 40 through the resistance to control an electric current, or an electric power by combining the electric current with the voltage.

While the invention has been described with respect to a limited number of embodiments, those skilled in the art having benefit of this disclosure, will appreciate that other embodiments can be devised which do not depart from the scope of the invention as disclosed herein. Accordingly, the scope of the invention should be limited only by the attached claims.

[Description of Reference Numerals and Signs]

10 ... power device 12 ... switching regulator 14 ... charge pump circuit 16, 18 ... LED 20 ... NMOS transistor 22 ... control circuit 34, 36 ... comparator 38, 40 ... error amplifier

What is claimed is:

1. A power device comprising:
   a switching regulator having
      a switching element connected to a transformer or a coil, and
      a control circuit for
         generating an on/off signal to control the switching element, and
         supplying an input voltage from a power source to a first load by the on/off operation of the switching element in accordance with the on/off signal; and
   a charge pump circuit for
      accumulating an electric charge in accordance with the input voltage from the power source during an operation for turning on the switching element, and
      discharging the accumulated electric charge to a second load during an operation for turning off the switching element.

2. A power device according to claim 1, wherein the control circuit
   controls an on-duty of the on/off signal to the switching element in accordance with the voltage supplied to the first load, and
   controls the a frequency of the on/off signal to the switching element in accordance with the electric charge discharged to the second load.

3. A power device according to claim 2, wherein the charge pump circuit has a switch for specifying an operation and a non-operation of the charge pump circuit and the switch is inserted between the power source and the switching element.

4. A lighting device for a vehicle comprising:
   the power device according to claim 3 and
   the first load and the second load,
   wherein the first load and the second load are light emitting sources of vehicles having different electric powers from each other or light emitting sources of different kinds of vehicles.

5. A lighting device for a vehicle comprising:
   the power device according to claim 2 and
   the first load and the second load,
   wherein the first load and the second load are light emitting sources of vehicles having different electric powers from each other or light emitting sources of different kinds of vehicles.

6. A power device according to claim 1, wherein
   the charge pump circuit has a switch for specifying an operation and a non-operation of the charge pump circuit, and
   the switch is inserted between the power source and the switching element.

7. A lighting device for a vehicle comprising:
   the power device according to claim 6 and
   the first load and the second load, wherein the first load and the second load are light emitting sources of vehicles having different electric powers from each other or light emitting sources of different kinds of vehicles.

8. A power device according to claim 1, wherein the charge pump circuit includes a diode and a condenser connected to each other in series,
one end of the diode is connected to the power source,
one end of the condenser is connected to the switching element, and
voltage is supplied to the second load from a connecting part of the diode and the condenser.

9. A lighting device for a vehicle comprising:
the power device according to claim 8 and
the first load and the second load,
wherein the first load and the second load are light emitting sources of vehicles having different electric powers from each other or light emitting sources of different kinds of vehicles.

10. A lighting device for a vehicle comprising:
the power device according to claim 1 and
the first load and the second load,
wherein the first load and the second load are light emitting sources of vehicles having different electric powers from each other or light emitting sources of different kinds of vehicles.

\* \* \* \* \*